Patented Nov. 16, 1926.

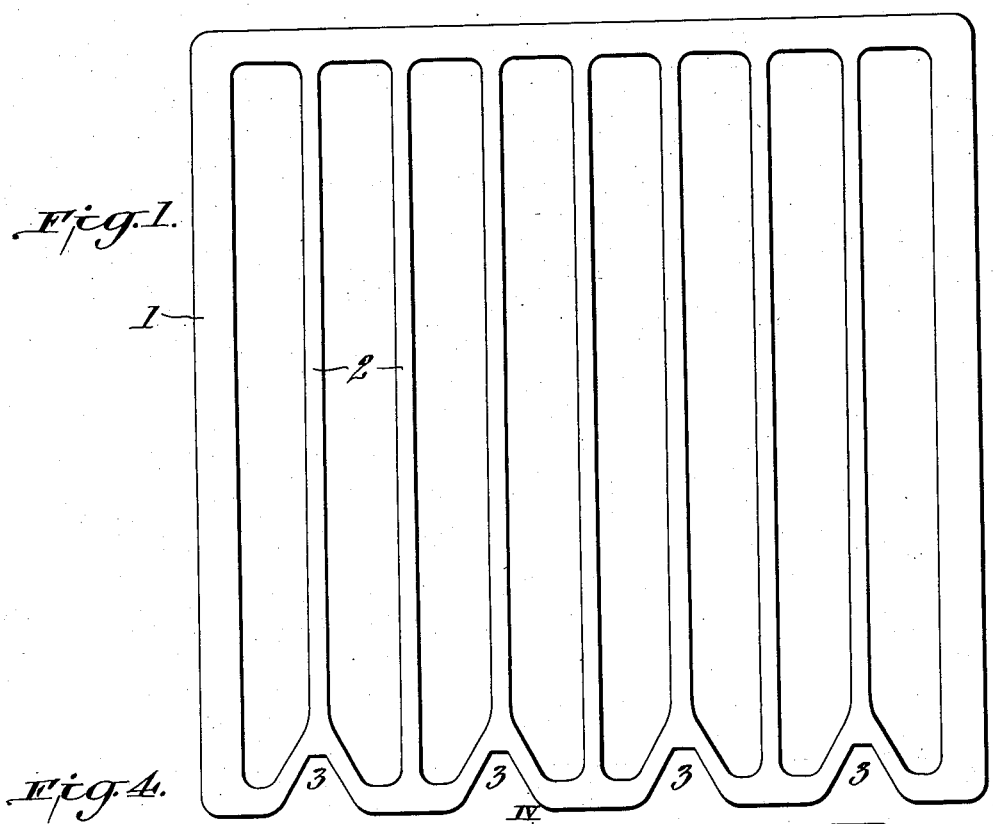
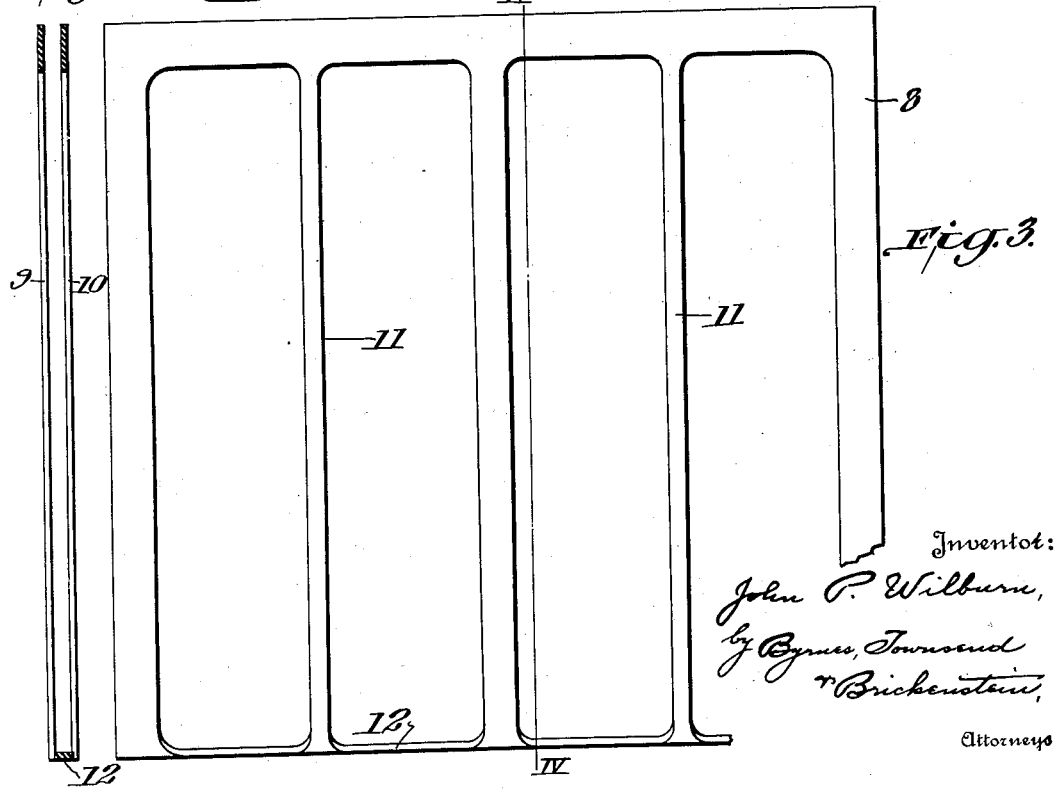

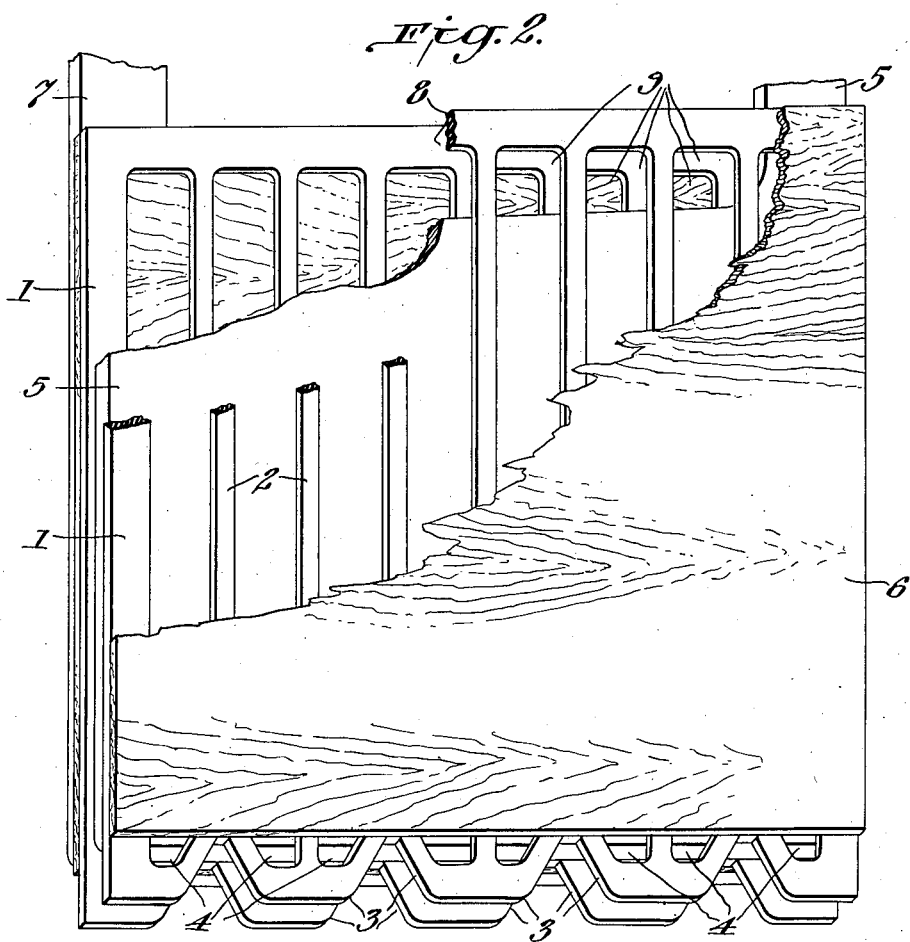

1,607,496

UNITED STATES PATENT OFFICE.

JOHN P. WILBURN, OF INDIANAPOLIS, INDIANA, ASSIGNOR TO THE PREST-O-LITE COMPANY, INC., A CORPORATION OF NEW YORK.

SEPARATOR FOR STORAGE-BATTERY ELECTRODES.

Application filed February 1, 1923. Serial No. 616,386.

This invention relates to separating means for storage battery electrodes. A particular object of the invention is to provide an improved combination separator comprising a sheet of wood or composition material protected on one or both sides by an auxiliary spacer composed of a strong, acid-resisting material.

It is well known that the advantages of separators made from wood, wood pulp, or the like, are coupled with certain objectionable features. One of the chief objections is the low mechanical strength of the separator, especially after it has stood for some time in contact with the electrolyte. Warping or buckling of the electrode plates exerts a pressure which the separator is unable to withstand, and in consequence the distorted plates come into contact with those adjacent to them, resulting in short circuits which impair or destroy the effectiveness of the battery.

Further, if wooden separators are placed so as to rest against the lead peroxid plate, they are subject to rapid deterioration.

In the endeavor to protect such separators from destructive pressure and disintegration by the active agents of the battery, it has heretofore been proposed to adopt the general combination of wooden separator and protective means referred to above. This has in general taken the form of a perforated sheet of hard rubber placed on one or both sides of a ribbed wooden separator.

According to the preferred embodiment of the present invention, a strong, inert auxiliary separator, in the form of a frame having connecting and strengthening members occupying a relatively small or minor part of the space which it defines, is used with plane wooden separators, which are preferably arranged with the grain running horizontally. Important advantages result from this new construction and arrangement, as will be clear from the following description.

Reference is to be made to the accompanying drawings, in which—

Fig. 1 is an elevation of an auxiliary spacer;

Fig. 2 is a perspective view, partly broken away, showing the auxiliary spacer of Fig. 1 assembled with wooden separators and an electrode;

Fig. 3 is an elevation of a spacer adapted to engage both faces of an electrode plate; and Fig. 4 is a vertical transverse section on line IV—IV, Fig. 3.

Referring to Figs. 1 and 2 of the drawings, numeral 1 denotes a frame of relatively strong material, not subject to deterioration in acid electrolyte. Hard rubber is the preferred material, but celluloid or other equivalents may be used. The top and bottom of the frame are connected by intermediate integral strips 2 of small area. The strips may of course be disposed in other ways than that shown.

The base of the auxiliary spacer so formed is preferably provided with indentations 3 adapted to receive the bridges used to raise the plates and separators from the bottom of the battery jar. Openings 4 are thus left adjacent to the lower margins of the positive plate 5 and negative plate 7 (Fig. 2) and through these openings active material dislodged from the plates may pass into a sediment space beneath the electrode assembly. Circulation of electrolyte is also materially facilitated by the downward extension of the auxiliary spacer in the manner described. Free diffusion is also obtained at the top of the elements due to the open spaces 8 and 9.

An auxiliary spacer 1 is placed on each side of the positive electrode 5. Plane or uncorrugated wooden sheets 6 rest against the auxiliary separators and are spaced thereby from the electrode. The detrimental action of the positive active material is substantially avoided by this arrangement. The negative plates 7, only one of which is shown, may be placed in direct contact with the wooden sheets, as the wood is not harmed by such contact.

The provision of ribs or corrugations on wooden separators, heretofore generally considered necessary for permitting proper diffusion of electrolyte, is avoided by the use of the new auxiliary spacer of very open construction. Ample space for diffusion is provided by this type of spacer inasmuch as it leaves the major portion of the separator face exposed to the electrolyte. In this respect the present invention is distinguished from the prior art referred to above, in which finely perforated hard rubber sheets are placed in protective relation to wooden separators. Ribbed separators are necessary under such conditions.

The elimination of the ribbing operation is of marked advantage from the commercial standpoint. In addition, since a plane surfaced wooden separator may be used, the grain of the wood may extend either horizontally or vertically. It will be understood that the horizontal grain arrangement is not practical with ribbed separators, for the reason that the ribs must extend vertically in the battery, and this would necessitate cutting the ribs across the grain of the wood.

I have found that the horizontal grain arrangement is preferable, because the tendency for the separator to be warped or deflected into contact with the positive plate is greatly reduced by this arrangement. Referring to Fig. 2 it will be apparent that the possibility of the separator 6 becoming distorted to such an extent between the ribs 2 that contact will result between the positive plate 5 and the separator 6 is very slight. However, if separator 6 were turned through an angle of 90 degrees to bring the grain of the wood into a vertical position, there would be a probability of contact being established between the separator 6 and positive plate 5.

In Figs. 3 and 4 an auxiliary spacer 8, of a type generally similar to that described, is illustrated. This spacer comprises parallel frames 9 and 10, each having reinforcing connecting strips 11. The frames are connected at the bottom by suitable means. A double or folder type of spacer is thus produced.

In the form of the invention illustrated, the spacer is made from an integral hard rubber blank, the median portion 12 of which is retained to serve as a connection between the two frames 9 and 10. A positive electrode may be placed within the double spacer, which will serve to keep the wooden separating sheets at the proper distance from the electrode and thus removed from its oxidizing action. The connecting portion 12 should lie substantially within the planes of the sides of the electrode, so that the active material which is displaced may fall into the space provided for it.

An alternative method of assembly is to place each negative electrode and the two adjacent wooden sheets within the double separator. In this way the same advantages are secured.

Auxiliary spacers of the type shown in Fig. 1 may be made in double form also, if desired. In either form of the invention, the spacers may be made by molding rubber or other suitable material into the desired shape, or they may be cut from sheet stock, or otherwise suitably formed.

Instead of wooden separators, other spacing means, normally not sufficiently strong and acid-resistant, may be used in combination with the protecting frames described. For example, fabricated sheets of cellulosic fibers or the like may be so used.

In electrode assemblies comprising the improved auxiliary spacers, the separator sheets are afforded proper protection against failure owing to pressure exerted by the plates and are also effectively prevented from injurious contact with the positive electrode. At the same time, adequate circulation of electrolyte and proper disposal of sloughed active material is insured.

These and other advantages of the novel construction are not dependent upon the specific forms of the invention illustrated, and various modifications may be made therein without sacrificing such advantages or exceeding the scope of the appended claims.

I claim:—

1. In combination with a positive lead storage battery electrode and plane uncorrugated wooden separator sheets, auxiliary spacers interposed between the electrode and the wooden sheets, said auxiliary spacers each comprising an inert, acid-resistant frame having members occupying a minor portion only of the space defined by the frame and connecting opposed sides thereof.

2. The invention according to claim 1, in which the auxiliary spacers extend beyond the margin of the electrode and are provided with openings facilitating circulation of electrolyte and passage of dislodged active material.

3. The invention according to claim 1, in which the auxiliary separators extend above and below the electrode and are provided with openings facilitating circulation of electrolyte and passage of dislodged active material.

4. The invention according to claim 1, in which the wooden separator sheets are arranged with the grain running horizontally of the battery.

5. In combination, a storage battery electrode, a wooden separator having plane surfaces and the grain running horizontally, and auxiliary spacing means independent of the wooden separator and spacing it from the electrode.

6. In combination, an electrode plate, spacing means in contact with said plate and extending beyond the margin of the same, and a wooden separator abutting against the spacing means, the extended portions of the spacing means having openings through which dislodged active material may pass and through which free diffusion may take place.

7. In a storage battery, the combination of positive electrodes, negative electrodes, plane uncorrugated separators between said positive and negative electrodes, and auxiliary spacers disposed against said separators, each spacer comprising a plurality of connected electrolyte-resistant members extending above and below said electrodes and occupying a minor portion only of the face of the adjoining separator so as to leave openings for diffusion of electrolyte and for passage of dislodged active material and also to leave the major portions of such separator faces exposed to electrolyte.

In testimony whereof, I affix my signature.

JOHN P. WILBURN.